US007782806B2

(12) United States Patent
Vrcelj et al.

(10) Patent No.: US 7,782,806 B2
(45) Date of Patent: Aug. 24, 2010

(54) TIMING SYNCHRONIZATION AND CHANNEL ESTIMATION AT A TRANSITION BETWEEN LOCAL AND WIDE AREA WAVEFORMS USING A DESIGNATED TDM PILOT

(75) Inventors: Bojan Vrcelj, San Diego, CA (US); Ashok Mantravadi, San Diego, CA (US); Fuyun Ling, San Diego, CA (US); Krishna Kiran Mukkavilli, San Diego, CA (US); Raghuraman Krishnamoorthi, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 11/373,607

(22) Filed: Mar. 9, 2006

(65) Prior Publication Data

US 2007/0211765 A1    Sep. 13, 2007

(51) Int. Cl.
    *H04B 7/00* (2006.01)
(52) U.S. Cl. .................. 370/310; 370/315
(58) Field of Classification Search ............ 370/310, 370/315, 316, 319, 321, 324; 375/130, 140, 375/147, 149; 455/130, 230, 255, 257, 265
    See application file for complete search history.

(56) References Cited

U.S. PATENT DOCUMENTS

| 6,005,605 | A | 12/1999 | Kostreski et al. |
| 6,256,508 | B1 | 7/2001 | Nakagawa et al. |
| 6,317,470 | B1 | 11/2001 | Kroeger et al. |
| 6,747,948 | B1 | 6/2004 | Sarraf et al. |
| 7,236,554 | B2 | 6/2007 | Gupta |
| 7,391,828 | B2 * | 6/2008 | Liu et al. ............... 375/342 |
| 7,430,430 | B2 | 9/2008 | Li et al. |
| 2003/0045314 | A1 | 3/2003 | Burgan et al. |
| 2004/0181403 | A1 | 9/2004 | Hsu |
| 2004/0203789 | A1 | 10/2004 | Hammond et al. |
| 2004/0258024 | A1 | 12/2004 | Tiedemann et al. |
| 2005/0122928 | A1 * | 6/2005 | Vijayan et al. ........... 370/312 |
| 2006/0250937 | A1 | 11/2006 | Wang et al. |

FOREIGN PATENT DOCUMENTS

EP    0656702    6/1995

(Continued)

OTHER PUBLICATIONS

Van Nee, et al, "OFDM for Wireless Multimedia Communications," Jan. 1, 2000, Artech House, Boston, USA, XP002387118 Paragraph [5.2.1].

(Continued)

*Primary Examiner*—Chi H Pham
*Assistant Examiner*—Fan Ng
(74) *Attorney, Agent, or Firm*—Gerald P. Joyce, III

(57) ABSTRACT

Systems and methods are provided for channel estimation and timing synchronization in a wireless network. In an embodiment, a method is provided for time synchronization at a wireless receiver. The method includes decoding at least one TDM pilot symbol located at a transition between wide and local waveforms and processing the TDM pilot symbol to perform time synchronization for a wireless receiver. Methods for channel estimation at a wireless receiver are also provided. This includes decoding at least one TDM pilot symbol and receiving the TDM pilot symbol from an OFDM broadcast to facilitate channel estimation for a wireless receiver.

18 Claims, 12 Drawing Sheets

FOREIGN PATENT DOCUMENTS

| | | |
|---|---|---|
| EP | 1 244 234 A2 | 9/2002 |
| KR | 1020050061559 | 6/2005 |
| WO | 9941854 | 8/1999 |
| WO | WO 2006/015268 A2 | 2/2006 |

OTHER PUBLICATIONS

"cdma2000 High Rate Packet Data Air Interface Specification," 3GGP2 C.S0024-A V.1.0, Mar. 1, 2004, pp. 13-46, XP000863923.

QUALCOMM Incorporated: "Detailed Description of the Enhanced BCMCS Transmit Waveform Description," C30-20040823-060, Aug. 23, 2004, XP000863922.

TIA TR47: Forward Link Only AIR Interface Specification Rev 1.1, XP002387062.

International Search Report - PCT/US06/008762, International Searching Authority - European Patent Office, Jul. 13, 2006.

Written Opinion-PCT/US06/008762, International Searching Authority-European Patent Office, Jul. 13, 2006.

* cited by examiner

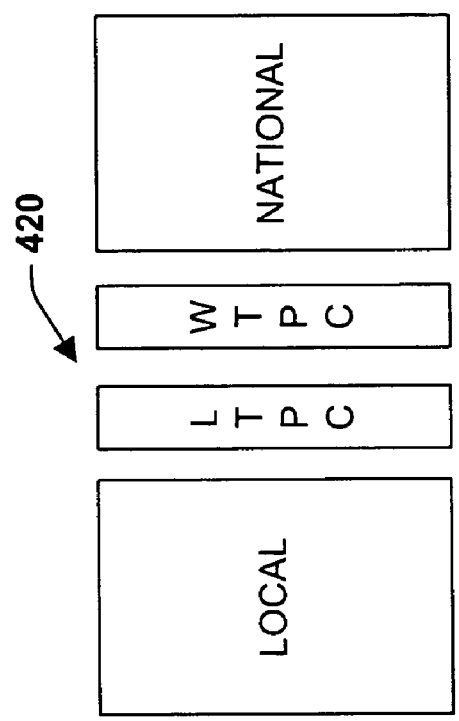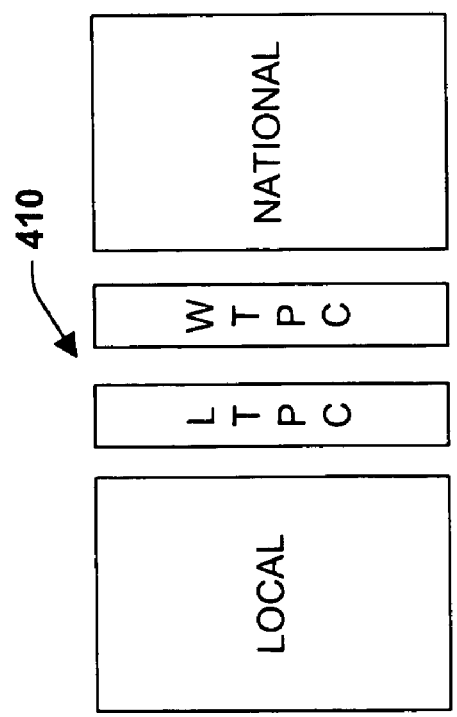
FIG. 4

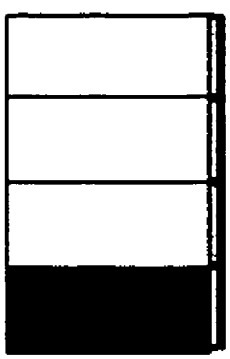
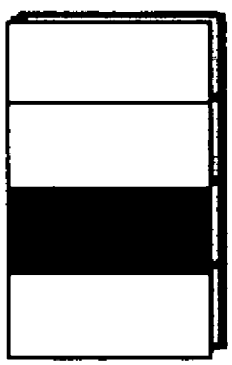
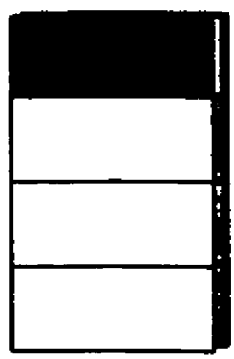
FIG. 5

TIMING SYNCHRONIZATION AND CHANNEL ESTIMATION AT A TRANSITION BETWEEN LOCAL AND WIDE AREA WAVEFORMS USING A DESIGNATED TDM PILOT

BACKGROUND

I. Field

The subject technology relates generally to communications systems and methods, and more particularly to systems and methods that perform enhanced time synchronization and channel estimation in accordance with wireless networks.

II. Background

Orthogonal frequency-division multiplexing (OFDM) is a method of digital modulation in which a signal is split into several narrowband channels at different frequencies. These channels are sometimes called subbands or subcarriers. The technology was first conceived during research into minimizing interference among channels near each other in frequency. In some respects, OFDM is similar to conventional frequency-division multiplexing (FDM). The difference lies in the way in which the signals are modulated and demodulated. Generally, priority is given to minimizing the interference, or crosstalk, among the channels and symbols comprising the data stream. Less importance is placed on perfecting individual channels.

In one area, OFDM has also been used in European digital audio broadcast services. The technology lends itself to digital television, and is being considered as a method of obtaining high-speed digital data transmission over conventional telephone lines. It is also used in wireless local area networks. Orthogonal Frequency Division Multiplexing can be considered an FDM modulation technique for transmitting large amounts of digital data over a radio wave where OFDM operates by splitting a radio signal into multiple smaller sub-signals or sub-carriers that are then transmitted simultaneously at different frequencies to the receiver. One advantage of OFDM technology is that it reduces the amount of crosstalk in signal transmissions where current specifications such as 802.11a WLAN, 802.16 and WiMAX technologies employ various OFDM aspects.

In some systems deploying OFDM technology, transmissions are intended for many users simultaneously. One such example is a broadcast or multicast system. Further, if different users can choose between different portions of the same transmission, the data in each transmission is typically time division multiplexed (TDM). It is often the case that the data intended for transmission is organized into fixed structures such as frames or superframes. Different users can then choose to receive different portions of a superframe at any given time. In order to assist the multitude of users with synchronization to the timing and frequency of the broadcast signal, time division multiplexed (TDM) pilot symbols are sometimes inserted at the beginning of each superframe. In one such case, each superframe begins with a header consisting, among other things, of two TDM pilots, called TDM pilot 1 and TDM pilot 2. These symbols are used by the system to achieve initial frame synchronization, also called initial acquisition.

In order to further assist with time and/or frequency synchronization during a superframe, also called time or frequency tracking, additional pilot symbols may be used. Time and frequency tracking may be achieved using the frequency division multiplexed (FDM) pilots, which may be embedded in each transmitted data OFDM symbol. For instance, if each OFDM symbol consists of N subcarriers, N-P of them can be used for data transmission and P of them can be assigned to FDM pilots. These P FDM pilots are sometimes uniformly spread over the N subcarriers, so that each two pilots are separated by N/P−1 data subcarriers. Such uniform subsets of subcarriers within an OFDM symbol are called interlaces.

Time domain channel estimates are used for time tracking during a superframe. Time domain channel estimates are obtained from FDM pilots, embedded in data OFDM symbols. The FDM pilots can be always placed on the same interlace, or they can occupy different interlaces in different OFDM symbols. The subset of subcarriers with indices i+8k is sometimes called the $i^{th}$ interlace. In this instance, N/P=8. In one case, the FDM pilots can be placed on interlace 2 during one OFDM symbol, on interlace 6 during the following symbol, then back on interlace 2 and so forth. This is called (2,6) staggering pattern. In other instances, the pilot staggering pattern can be more complicated, so that the occupied interlaces describe the pattern (0,3,6,1,4,7,2,5). This is sometimes called the (0,3,6) staggering pattern. Different staggering patterns make it possible for the receiver to obtain channel estimates longer than P time-domain taps. For example, (2,6) staggering pattern can be used at the receiver to obtain channel estimates of length 2P, while (0,3,6) staggering pattern can lead to channel estimates of length 3P. This is achieved by combining the channel observations of length P from consecutive OFDM symbols into a longer channel estimate in a unit called the time filtering unit. Longer channel estimates in general may lead to more robust timing synchronization algorithms.

Some broadcast systems are intended for different types of transmission simultaneously. For example, some of the broadcast data may be intended for any potential user within the wide-area network, and such data is called wide-area content. Other data symbols transmitted on the network may be intended only for users currently residing in a specific, local portion of the network. Such data is called local-area content. The data OFDM symbols, belonging to different contents may be time division multiplexed within each frame in a superframe. For example, certain portions of each frame within a superframe may be reserved for wide-area content and the other portions for local content. In such cases, the data and pilots intended for different contents can be scrambled using different methods. Moreover, the set of transmitters that are simultaneously broadcasting the wide-area and the local content within a superframe can be different. It is therefore quite common that the time domain channel estimates, as well as channel observations, associated with wide-area content and those associated with local content can be quite different.

In the above scenarios, special strategy needs to be deployed for channel estimation on OFDM symbols grouped near the boundary between the wide-area and local waveforms. This is because channel observations from wide-area symbols cannot be combined with those from local symbols in a seamless manner. Similar concept holds for time tracking on OFDM symbols located soon after the waveform boundary. If time tracking is based on time-domain channel estimates, and if observations from three consecutive OFDM symbols are needed for a single channel estimate, time tracking cannot be performed during the first few OFDM symbols after the waveform boundary. Therefore, alternative channel estimation and timing synchronization techniques may be needed.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Receiver processing components and methods are provided for a wireless network. At least one Time Domain Multiplexed (TDM) pilot symbol, in addition to TDM pilots 1 and 2, is processed at a wireless receiver along with other super frame symbols and parameters where such aspects as time synchronization and channel estimation are performed based on the additional pilot symbol which can be referred to as TDM3 or TDM pilot 3 in one example. In an embodiment, receiver components are provided that account for aspects that were not previously considered for timing and channel estimation due in part to the fact that the pilot symbols and associated data may not be scrambled in a similar manner from one waveform boundary to another (e.g., local to wide-area boundary). Given the nature and structure of the added pilot symbol, channel estimations can be performed on either side of local and wide-area waveform boundary appearing in a data frame.

In another embodiment and as noted above, at least one additional TDM pilot symbol is added to a conventional broadcast symbol set (e.g., set including TDM1 and TDM2) at regular or determined intervals within a super frame broadcast. In this case, a TDM3, TDM4 and so forth pilot symbols may be added to an existing pilot set to mitigate timing and channel estimation problems within an Orthogonal Frequency Division Multiplexing (OFDM) network for multimedia data transfer organized in superframes, where different portions of a superframe are intended for different waveform delivery. For example, a number of TDM3 symbols could be processed from a symbol set at each boundary which could be placed at the waveform boundaries in the super frame to facilitate synchronization and channel estimation. Similar to TDM Pilot 2, TDM Pilot 3 (or symbol subset) can be designed to provide timing synchronization and channel estimation except that TDM Pilot 2 is limited for Wide-area channel and TDM Pilot 3 can be employed for either wide-area or local channel depending on the position in a super frame. The structure of the TDM pilot 3 may be different from the structure of TDM pilot 2. If the TDM Pilot 3 (or other additional pilots) is located between a transition from wide-area waveform to local waveform in the super frame, it can be utilized for wide-area channel estimation or local channel estimation and timing. If the TDM Pilot 3 is located at the transition from local to wide-area, it can be used for local channel estimation or wide-area timing and channel estimation.

To the accomplishment of the foregoing and related ends, certain illustrative embodiments are described herein in connection with the following description and the annexed drawings. These aspects are indicative of various ways in which the embodiments may be practiced, all of which are intended to be covered.

BRIEF DESCRIPTION OF THE DRAWINGS

FIG. 4 illustrates an alternative embodiment, where multiple TDM Pilot 3 symbols are employed between local and wide-area boundaries.

FIG. 5 illustrates example patterns for additional timing pilot symbols.

DETAILED DESCRIPTION

Figure 1:
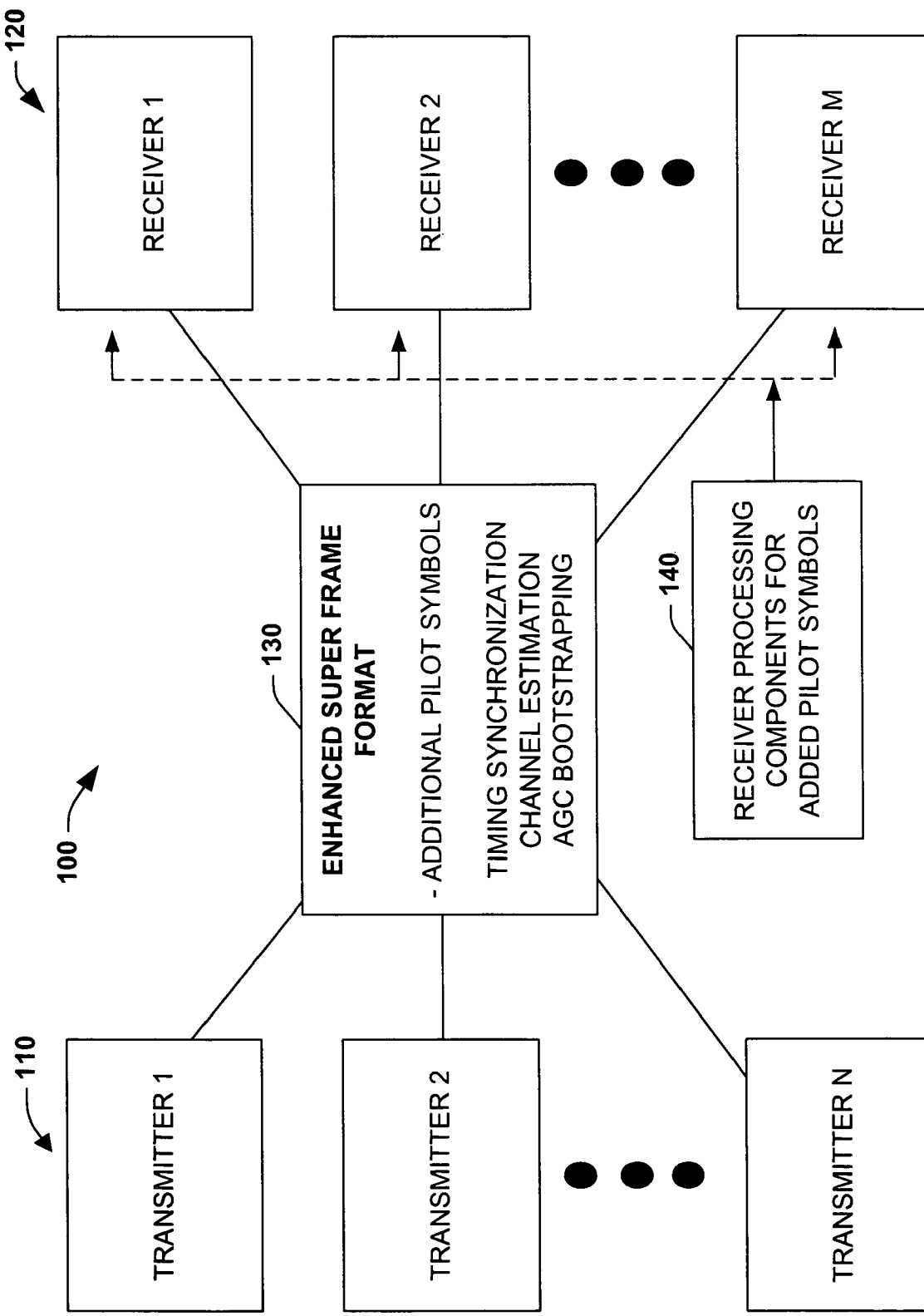
FIG. 1 is a schematic block diagram illustrating a wireless communications network employing an enhanced super frame structure and receiver processing components.

Systems and methods are provided for channel estimation and timing synchronization in a wireless network. In one embodiment, a method is provided for time synchronization at a wireless receiver. The method includes decoding at least one new TDM pilot symbol in addition to TDM1 and TDM2 and processing the new TDM pilot symbol from a channel boundary of an OFDM broadcast to perform time synchronization for a wireless receiver. Methods for channel estimation at a wireless receiver are also provided. This includes decoding at least one new TDM pilot symbol and receiving the new TDM pilot symbol from an OFDM broadcast to facilitate channel estimation for a wireless receiver.

In another embodiment, a method is provided for channel estimation, time-synchronization, and AGC bootstrapping for data symbols located near the boundary between different types of traffic in a Multicast Wireless System using Time-Division Multiplexed (TDM) Pilot Symbols. The method includes determining at least one new TDM pilot symbol in addition to a TDM1 symbol and a TDM2 symbol. This also includes inserting at least one new TDM pilot symbol between two OFDM symbols belonging to different broadcast waveforms in order to facilitate decoding of an OFDM transmission block immediately prior to or immediately following the boundary. The new TDM pilot symbol or symbols can be employed for channel estimation, time synchronization, and for automatic gain control (AGC) bootstrapping among other aspects.

As used in this application, various wireless communications terms are employed. For wireless transmission, on transmitted packet structure can include an Orthogonal Frequency Division Multiplexing (OFDM) symbol that consists of 4642 time-domain base-band samples called OFDM chips. Among these OFDM chips are 4096 data and pilot chips, originating from 4096 data and pilot subcarriers in the frequency domain. These chips are cyclically extended, with 529 chips preceding the useful portion and 17 following the useful portion. To reduce the OFDM signal's out-band energy, the first 17 chips and the last 17 chips in an OFDM symbol have a raised cosine envelope. The first 17 chips of an OFDM symbol overlap with the last 17 chips of the OFDM symbol that precede them. As a result, the time duration of each OFDM symbol is 4625 chips long.

In one transmission data packet example, data can be generally organized into super frames, where each super frame has a one second duration. A super frame consists of 1200 symbols that are OFDM modulated with 4096 sub-carriers. With respect to sub-carriers, an interlace refers to a subset of sub-carriers spaced by a certain amount (e.g., spacing of 8). For example, 4096 sub-carriers could be divided into 8 interlaces, where the subcarriers in the $i^{th}$ interlace are those with indices 8k+i. Among the 1200 OFDM symbols in a super frame, there are: Two TDM pilot symbols (TDM1, TDM2); One wide-area and one local identification channel (WIC and LIC) symbols; Fourteen overhead information symbols (OIS) channel symbols; A variable number of two, six, 10, or 14 pilot positioning symbols (PPC) symbols for assisting with position location; A certain number of Transitional Pilot Channel (TPC) symbols, or TDM3 pilots, which are located on each boundary between wide-area and local content data; and the remaining symbols are used for broadcast of either wide-area or local area waveform. Each superframe consists of four data frames, as well as overhead symbols.

Time Division Multiplexing (TDM) Pilot Symbol 1 (TDM1) is the first OFDM symbol of each super frame, where TDM1 is periodic and has a 128 OFDM chip period. The receiver uses TDM1 for frame synchronization and initial time (course timing) and frequency acquisition. Following TDM1, are two symbols that carry the wide-area and local IDs, respectively. The receiver uses this information to perform proper descrambling operations for the corresponding content, utilizing the corresponding PN sequences. Time division Multiplexing pilot Symbol 2 (TDM2) follows the wide-area and local ID symbols, where TDM2 is periodic, having a 2048 OFDM chip period, and contains two and a fraction periods. The receiver uses TDM2 when determining accurate timing for demodulation of the OIS channel.

Following TDM2 are: One wide-area TPC (WTPC) symbol; Five wide-area OIS symbols; Five wide-area FDM Pilot symbols; Another WTPC; One local TPC (LTPC) symbol; Five local OIS symbols; Five local-area FDM Pilot symbols; Another LTPC; and Four data frames follow the first 18 OFDM symbols described above. A data frame is subdivided into a wide-area data portion and a local data portion. The wide-area waveform is pre-pended and appended with the wide-area TPC—one on each end. This arrangement is also used for the local data portion. In this embodiment there is a total of 10 WTPC and 10 LTPC symbols per superframe.

In another embodiment, each transition between wide and local-area waveform is associated with a single TPC pilot symbol. The structure of a unique TPC pilot, is different from the structure of WTPC or LTPC symbols, since a single pilot symbol is designed to meet both wide and local-area channel estimation and synchronization requirements. In this embodiment there is a total of 11 TPC pilots (or TDM pilot 3 symbols) per superframe.

As used in this application, the terms "component," "network," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

FIG. 1 illustrates a wireless network system 100. The system 100 includes one or more transmitters 110 that communicate across a wireless network to one or more receivers 120. The receivers 120 can include substantially any type of communicating device such as a cell phone, computer, personal assistant, hand held or laptop devices, and so forth. The system 100 employs a plurality of enhanced super frame components 130 to facilitate various determinations in the system 100. It is noted that although the transmitters 110 may be employing the same super frame structure 130, that different application data is being sent from the respective transmitters within the respective structures associated with each transmitter. In one embodiment, at least one additional Time Domain Multiplexed (TDM) pilot symbol is added to a broadcast symbol set at regular or determined intervals within a super frame broadcast depicted at 130. Thus, a TDM3, TDM4 (or more) pilot symbols may be added to an existing pilot set at 130 to mitigate timing and channel estimation problems within an Orthogonal Frequency Division Multiplexing (OFDM) network on boundaries between wide-area and local data waveforms.

As will be described in more detail below, the additional symbols are processed as a symbol subset at the receiver 120 where the subset can include one or more additional TDM3 symbols that facilitate symbol decoding of data symbols located near the boundary between local and wide-area data waveforms. In one example, a symbol subset of two TDM3's could be received and processed at the receiver 120, where the subset appears between local and wide-area boundary locations in the super frame component 130. Thus, various embodiments can be provided. In one embodiment, one TDM pilot 3 symbol may be processed on each boundary in the super frame 130, whereas the structure and the processing of such pilot at the receiver 120 may be more complex. In other embodiments, two (or more) TDM pilot 3 symbols may be employed (with simpler structure and processing at the receiver) on most boundaries, except for right after TDM pilot 2, and right before PPC symbols which are described in more detail with respect to FIG. 2.

One or more receiver processing components 140 are provided to decode the super frame 140 and employ the added TDM pilot symbol for such aspects as timing synchronization and channel estimation, where the components 140 are shown generally and apply to a given receiver 120. Timing synchronization based on TDM pilot 3 for example, can be based in part on similar principles as synchronization based on TDM pilot 2—used during initial acquisition. Moreover, an algorithm for timing synchronization based on TPC pilot symbols will depend on whether a single or two-symbol TPC is deployed at waveform boundaries. However, components 140 for implementation are generally more complicated, especially if a single TPC pilot is present, since the pattern of pilot interlaces used in a single TPC symbol scenario is generally not fixed from one boundary to the other. Thus, the respective pattern can be determined as a function of a symbol index and based on this information and an assumption about channel location, the components 140 at the receiver 120 can select an appropriate set of combining coefficients. Based on analysis, the timing synchronization, which relies on TDM pilot 3 placed on waveform boundaries, can be expected to perform at least as well as time tracking algorithms deployed on data symbols inside wide-area and local traffic blocks. Apart from timing synchronization, the structure of TDM pilot 3 (or other added pilot symbols) allows for channel estimation for the symbols that lie on both sides of the boundary between wide-area and local data waveforms.

Additionally, the system 100 can include a pilot symbol protocol for a wireless receiver. This can include means for decoding at least one additional pilot symbol for a super frame, where the additional pilot symbol is in addition to TDM1 and TDM2 (e.g., reference numeral 120, demodulator described below). Also, the protocol includes means for receiving the super frame in the wireless network (e.g., reference 120) and means for processing the super frame to perform at least one of a channel estimation and a timing synchronization (e.g., reference 140).

Figure 2:
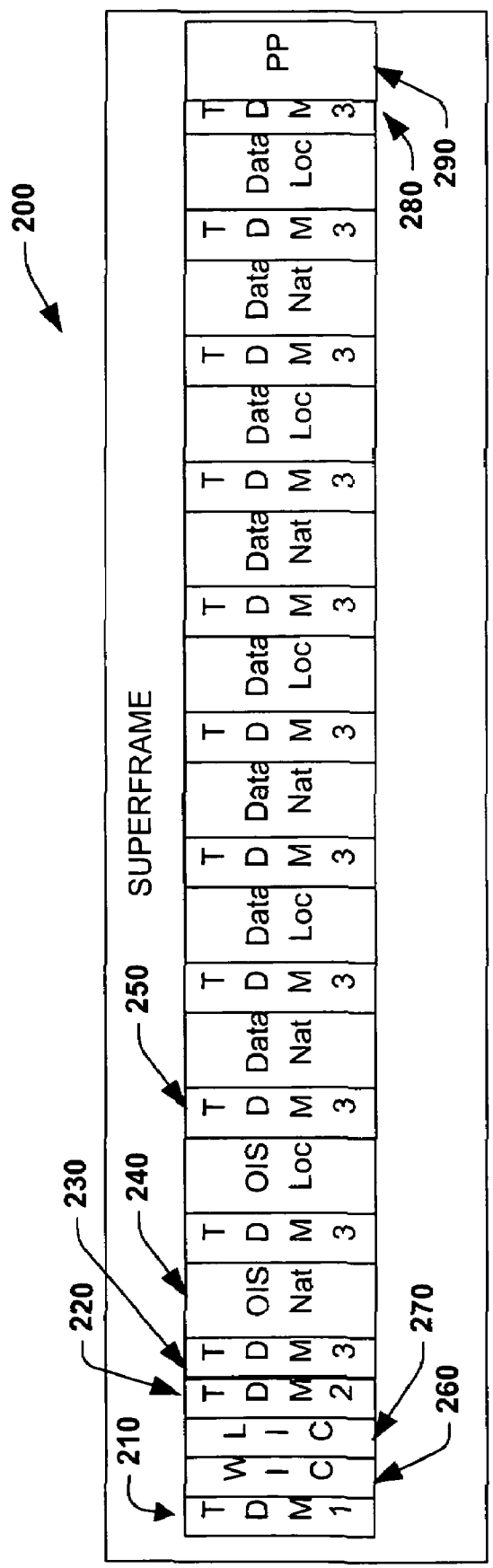
FIG. 2 illustrates an example super frame structure employing additional pilot symbols.

FIG. 2 illustrates an example super frame structure 200. While only one additional pilot symbol—TDM3 is shown in the example super frame 200, it is to be appreciated that more than one additional pilot symbol may be employed. The super frame structure 200 introduces new OFDM symbols to facilitate the broadcasting of multiple wide-area channels and multiple local channels in a wireless network. The first OFDM symbol of a super frame is generally TDM Pilot 1 at 210, where the second OFDM symbol TDM Pilot 2 is illustrated at 220. This sequence is followed by a first TDM Pilot 3 at 230 followed by a wide-area OIS (Overhead Information Symbols) at 240. Generally, a new, local, TDM Pilot 3 symbol 230 can be inserted before the local OIS symbols. This pattern generally repeats at all the junctions between wide-area and local channels such as at reference numeral 250 for example. However, it is noted that simpler processing may occur if a symbol subset having at least two symbols is placed at the boundaries between wide-area and local such as 250. Similar to TDM Pilot 2 220, TDM Pilot 3 230 and so forth can have four null odd interlaces (1,3,5,7) where the even interlaces (0,2,4,6) are occupied by pilots. Unlike the TDM Pilot 2 220, TDM Pilot 3 230 can employ three of four even numbered interlaces for local pilots and one for wide-area if located in the transition from wide-area to local or three for wide-area pilots and one for local if the TDM Pilot 3 is located in the transition from local to wide-area. This holds in one embodiment where a single TPC pilot is deployed on each boundary. In another embodiment, with two TPC symbols per boundary, Local Transitional Pilot Channel (LTPC) symbols have all interlaces occupied by local FDM pilots, and wide TPC (WTPC) symbols by wide-area FDM pilots. As can be appreciated, other configurations for the super frame 200 are possible.

As a baseline, two hundred and ninety data symbols can be employed per frame 200. Two new OFDM symbols, a wide-area 260 and local identification 270 channels (WIC & LIC) are introduced between TDM 1 and TDM 2 at the beginning of the super-frame 200. In the remaining part of the super-frame 200, e.g., twenty TDM 3 pilot symbols 250 are introduced. In another embodiment, eleven TDM 3 pilot symbols are introduced. In general, in embodiment with two TDM 3 pilots, there are two specialized OFDM symbols at each transition between wide-area and local channels. There can be exceptions, however. There is only one TDM 3 symbol before the first wide-area OIS symbol (WOIS) and one at the end of the last frame, before PPC symbols, as indicated by the use of a shorter slice for TDM 3 as indicated at 230 and 280 if FIG. 2.

A new positioning pilot channel (PPC) can be added at 290, and it includes P OFDM symbols at the end of the super-frame. The positioning pilots help in locating the receiver through triangulation methods.

TABLE 1

TDM pilot 3 locations, in embodiment with two TPC symbols per boundary W: number of Wide-area symbols per frame, P positioning pilots

| Transition | Symbol Index for wide-area TDM3 symbol | Symbol Index for local TDM3 symbol |
| --- | --- | --- |
| TDM2 → W-OIS | 4 | — |
| W-OIS → L-OIS | 10 | 11 |
| L-OIS → W-Data | 18 | 17 |
| W-Data → L-Data | 19 + W + (F + 4) * i, (i = 0, 1, 2, 3) | 20 + W + (F + 4) * i, (i = 0, 1, 2, 3) |
| L-Data → W-Data | 18 + (F + 4) * i, (i = 1, 2, 3) | 17 + (F + 4) * i, (i = 1, 2, 3) |
| L-Data → Pos. pilots | — | 1199-P |

Locations of TDM 3 symbols are shown in Table 1 above in embodiment with both wide-area and local TDM Pilot 3 symbols. The number of useful data OFDM symbols per frame is denoted by F, out of which W are used for wide-area channels and F−W for local channels, with W ranging from 0 to F. As mentioned previously, the base line value for F can be 290, which corresponds to a baseline value of six positioning pilots, P=6. However, if positioning pilots are not utilized, at least 2 symbols should be reserved with current numerology constraints. With P=2, the number of symbols per frame can be increased from 290 to 291. One relationship between F and P is given by $$F = 291 - \frac{P-2}{4}$$

It is noted that, from the description of TDM Pilot 3 symbol locations above, the TDM Pilot 3 symbols can also be interpreted as being part of the frame. In particular, the frame 200 can begin with the wide-area TDM3 symbol at the beginning and end with the local TDM3 symbol at the end, and can include the two TDM3 symbols at the transition from wide-area to local area within the frame. With this counting, the number of symbols per frame would be F+4, that is also the factor that appears in Table 1 above. Similarly, the TDM3 symbols around the OIS can be included into the OIS, resulting in 7 wide-area OIS and 7 local OIS symbols, with each OIS phase beginning and ending in a TDM3 symbol. Whether TDM3 symbols are considered as part of the frame & OIS is a matter of convention, but can also be driven by convenience for hardware. In an embodiment with single TPC symbol, such simple analogies are not possible, since there are in general F+2 symbols per frame, except one frame (first or last) which contains F+3 symbols.

Figure 3:
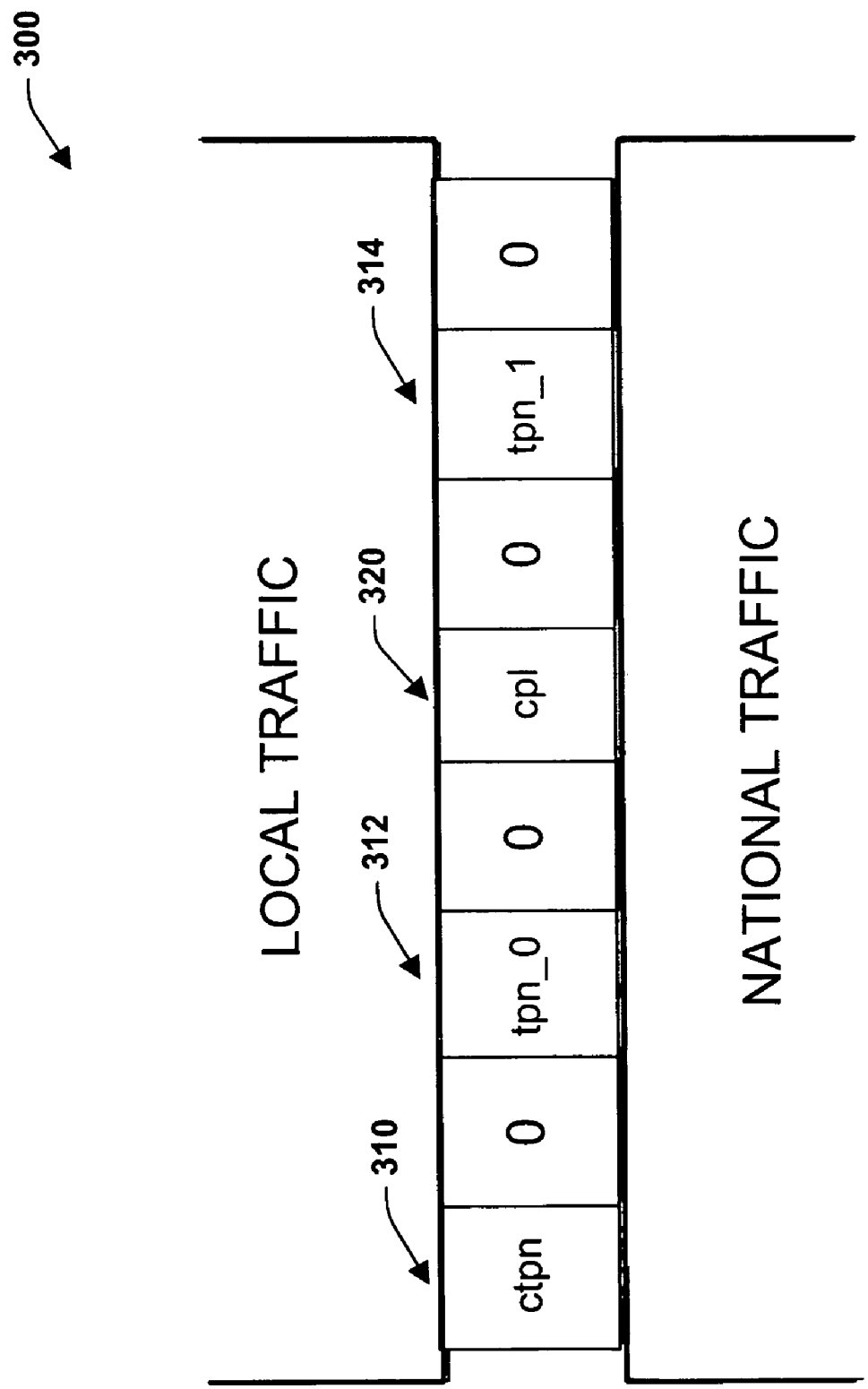
FIG. 3 illustrates an example pattern of additional pilot symbols.

FIG. 3 illustrates an example interlace pattern 300 for a single TPC symbol occurring on a waveform boundary. As noted above, a symbol called TDM pilot 3 is deployed at each local/wide-area and wide-area/local boundary. The structure of this symbol is shown in FIG. 3. Interlaces 0, 2 and 6 (in this example) at 310, 312, and 314 respectively are occupied by the wide-area pilots. Interlace 4 at 320 is used by local pilots. The acronym "ctpn" corresponds to channel estimation and timing wide-area pilot. In other words, this interlace can be used by the channel estimation block in the wide-area mode as the "previous symbol" FDM pilot interlace for the demodulation of the first wide-area symbol, and is also used for timing synchronization. Similarly, "cpl" denotes the pilot interlace used by the local channel estimation block when obtaining the "future symbol" channel observation. This observation is used for demodulating the last local traffic symbol. Pilot interlaces denoted by "tp." are used for timing synchronization of data symbols in the following area. These interlaces 310-320 are separated by null-interlaces where no energy is transmitted. In order to keep the total transmitted energy constant among all OFDM symbols (including symbols with all interlaces occupied), the nonzero interlaces in TPC pilots are being scaled up by a factor of $\sqrt{2}$. Local and wide-area channel estimation blocks should take this into account when using pilots denoted "cpl" and "cpn" (in particular, this implies that the receiver knows where these boundaries are).

Channel estimation pilots follow the occupancy pattern of the adjacent corresponding traffic. In other words, in the example 300 it is assumed that the (0,3,6) staggering pattern is deployed, and that the last local symbol keeps interlace 1 reserved for pilots; similarly, the pilots should reside on interlace 3 on the first symbol in the wide-area traffic region. If the (0,3,6) pilot staggering pattern is used, it is possible to impose constraints on both wide-area and local blocks, so that each of them consists of an odd number of symbols. In this way, it can be ensured that TDM 3 pilots follow the same pattern, where the odd interlaces are zeroed out. In embodiments which deploy the (2,6) staggering pattern, such restrictions are not necessary, since the TDM3 pilots always contain FDM pilots on even interlaces only. However, the location of the "cpl" interlace may be varying in this case from one waveform boundary to the next. The requirement geared at keeping only the even interlaces occupied in TDM3 pilots provides certain advantages to timing synchronization. Namely, if odd, instead of even interlaces are non-zero, the resulting time-domain signal ceases to be periodic (second period is a negative of the first period). This may slightly complicate the demodulation procedure, but the overhead is not significant and such implementations can be considered.

FIG. 4 illustrates an alternative embodiment, where multiple TDM Pilot 3 symbols are employed. In this embodiment, two additional pilot symbols are employed on boundaries between local and wide-area data waveforms. This is illustrated at 410 and 420 where a Local Transitional Pilot Channel (LTPC) and a wide-area Transitional Pilot Channel (WTPC) symbols are shown as a subset of symbols. As illustrated at 420, such groupings of LTPC and WTPC can appear between local and wide-area waveforms that appear in an OFDM transmission. In general, LTPC would be employed to decode the last packet of the local data structure where, the last local symbol may be referred to as local symbol L. Thus, a respective receiver would process a three symbol packet that includes local symbol L, local symbol L−1, and the respective LTPC to determine the channel estimate corresponding to the last local symbol L. If decoding the first wide-area symbol N, the three symbol packet for receiver processing would be the WTPC, the first wide-area symbol N, and the next wide-area symbol N+1. It is to be appreciated, that more than two TDM3 symbols can also be employed between local and wide-area data boundaries.

The symbol structure for TDM3 that is employed for LTPC and WTPC is similar to that of a normal data symbol. This includes eight slots that are occupied and the respective data symbols are all '0'before scrambling, where interlaces are a subset of carriers and slots are mapped to the interlaces in order to randomize filling of the interlaces. Scrambling seeds & masks, slot-to-interlace mapping and modulation symbol energies are similar as in a data symbol. In particular, the wide-area TDM3 symbols—WTPC are scrambled using a wide-area ID in the seed, and the local TDM3 symbols—LTPC are scrambled using both the wide-area and local IDs in the seed. In general, the receiver does not need to determine the locations of TDM3 in one example modem implementation, since it uses the FDM pilots in respective LTPC or WTPC symbols as if they were ordinary data symbols. Nevertheless, sending information regarding the TDM3 locations requires very little overhead and could be useful as an upgrade path for wake-up time tracking and timing synchronization based on TDM 3, where the TPC symbol corresponding to the following data content is also used for timing synchronization.

For an embodiment with a single TPC symbol on boundaries, and with (0,3,6) pilot staggering pattern, FIG. 5 illustrates possible timing pilot patterns 500. In the following, processing needed in this particular embodiment is described, while similar methods can be used for different embodiments. In the patterns 500, white boxes represent interlaces (in general, the interlaces corresponding to the following data content) which are used for timing synchronization. The pattern of white and black pilots on non-zero interlaces of TDM pilot 3 can be kept fixed (e.g., as in FIG. 3) if the number of symbols within wide-area and local areas are special—of the form 8n−1. Since this might not be the case, there can be four different patterns 500 again for the example of local to wide-area transition. Corresponding to each of the four different patterns at 500, the demodulation technique used by the timing synchronization can be slightly different.

Consider the timing synchronization on the transition from local to wide-area waveform in the mentioned embodiment with (0,3,6) pilot staggering and a single TPC symbol. (This is the more problematic situation for timing synchronization, since the wide-area estimated channel is often a superset of a local estimated channel.) Timing synchronization in some wireless networks is generally based on channel estimation. Since local pilots, denoted "cpl" in FIG. 3, are convolved by the corresponding local channel, their presence in the received signal cannot offer additional information on the wide-area channel. Thus, the three pilot interlaces can be used for timing synchronization. This leads to 1536-long wide-area channel estimates. It is noted that local pilots are only broadcast from local transmitters, and the deployed scrambling is also specific to that local area. Thus, all the receiver can extract from such local pilots is information on the local channel.

For simplicity, consider pattern 2 at 510 in FIG. 5, which is consistent with FIG. 3. By linearity one can assume that two separate symbols are being sent—one with wide-area interlaces and the other with the local interlace only—and that they are received after going through different channels—wide-area and local, respectively. This is depicted in FIG. 5 which is described in more detail below. Since interest is in estimating the wide-area channel h''(k), the content of the fourth received interlace (denoted by "x") is generally of no significance. What is actually received in this interlace is a linear combination $$\sum_i P_4^i \cdot H_4^{l,i},$$

where $H^{l,i}_4$ denotes the fourth interlace of the $i^{th}$ local channel.

Figure 6:
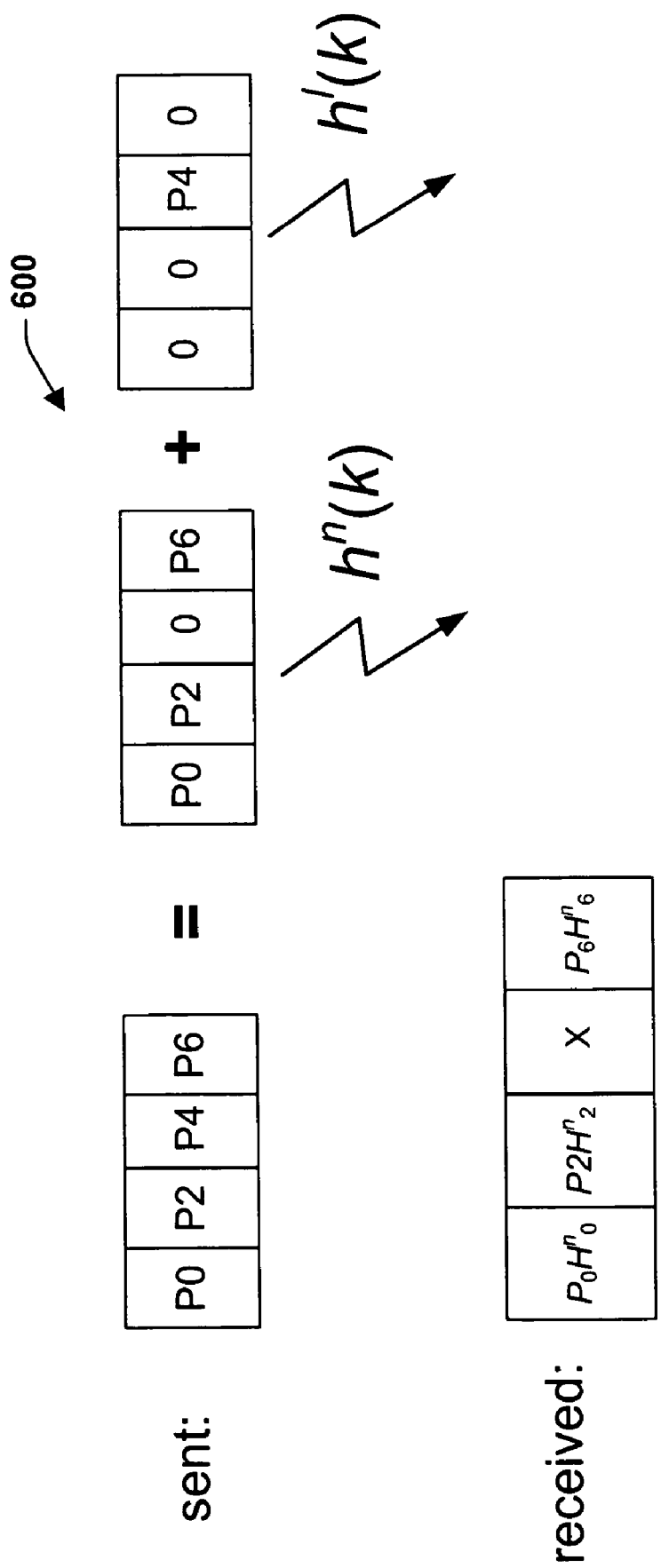
FIG. 6 illustrates an example structure for a received TDM pilot 3 symbol.

FIG. 6 illustrates an example structure 600 for a received TDM pilot 3 symbol. Note that nonzero interlaces are considered in FIG. 6, namely, the received OFDM symbol is periodic with two 2048-long periods, which are defined by the non-zero interlaces. By sampling one period, the non-zero interlaces are captured from FIG. 3. After appropriate sampling, 2K-FFT and de-scrambling (of wide-area pilots), an IFFT is performed. Generally, the corresponding step is to take a 2K-IFFT, which is realized as a cascade of four 512-IFFTs followed by phase ramps and a 4-point IFFT combiner.

Consider the output of a 512-IFFT and a phase ramp operating on interlace i. If the channel estimation is based on I pilot interlaces, then channels of length $I \cdot N_P$ can be estimated, where $N_P=512$ is the number of pilots per interlace.

In FIG. 6, I=3 and this corresponds to channel estimates of length 1536. A real channel of interest is of length 4096 (the same as the length of the useful portion of an OFDM symbol). However, in reality most of the non-zero channel taps are concentrated in a narrow region. In one embodiment, it can be assumed that the total delay spread (area occupied by non-zero channel taps) is at most 768 chips. This non-zero real channel can occur anywhere between taps 0 and 4095. The estimates of length 1536 represents the aliased version of the real channel of length 4096. The total channel response of interest (of length 4096) can be divided into eight bins: 0 through 7, where bin k consists of taps $512 \cdot k$ to $512 \cdot (k+1)-1$.

Figure 7:
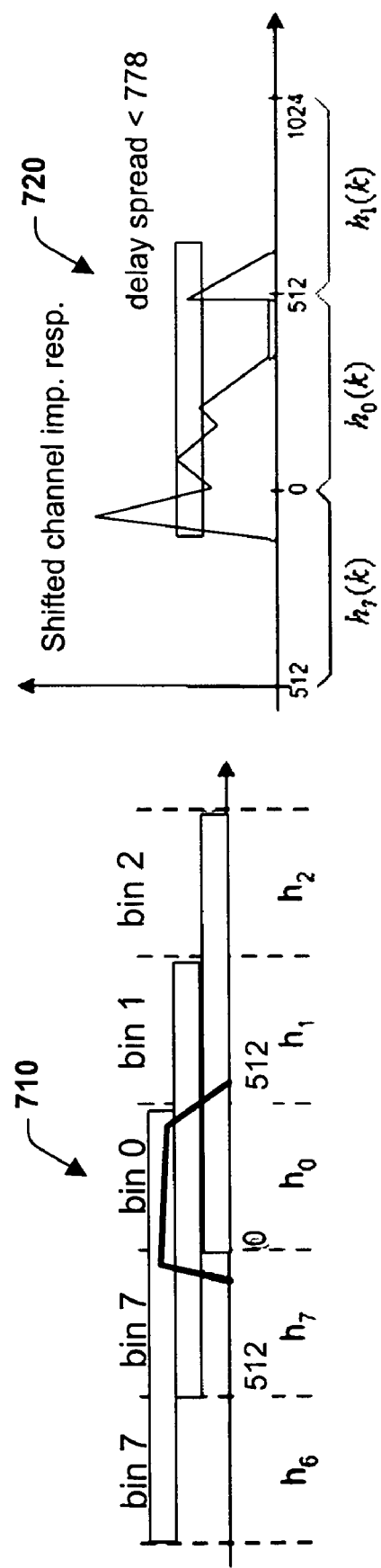
FIG. 7 illustrates the concept of channel bins and an example of channel estimate used for timing synchronization.

In general, the real non-zero channel content can be located in bins k, k+1 and k+2, modulo 8, whereas the estimated channel of length 1536 covers only the first three bins. Depending on the bin location of the non-zero channel, k, the channel gets aliased into the estimated three bins with different aliasing coefficients. Timing synchronization in one embodiment is based on locating the non-zero channel content within the 4096 channel taps and relating that information to the currently-applied symbol timing. Since, only 1536 consecutive taps can be viewed, and the channel inside can appear aliased differently based on its broader location, some initial assumption on the general channel location (on bins k, k+1 and k+2) needs to be made. Assuming some initial timing synchronization has already taken place, it is most likely for the non-zero taps to be present in bins (6,7,0) or (7,0,1). This is shown at 710 of FIG. 7. Depending on the timing algorithm used, the occupancy can be restricted to (7,0,1), as shown in FIG. 7 at 720; otherwise, an additional processing takes place prior to time tracking (also called DMTT, or data mode time tracking), to determine the occupancy pattern.

In yet another embodiment, receiver can use only two out of three pilot interlaces in TDM pilot 3, designated for time tracking, and estimate a channel of length 1024. Such time-domain channel estimate can be used for time tracking in a manner very similar to ordinary time tracking performed anywhere within a frame. The algorithm for such time tracking is simpler, since the aliasing in this case appears the same for all channel bins. The advantage of using a 1536-long channel estimate is that it makes time tracking more robust to large timing changes.

In the following the process of obtaining a 1536-long channel estimate from three pilot interlaces is described, with the understanding that a similar process can be used to obtain a 1024-long channel estimate using two pilot interlaces of a TPC symbol. Referring back to FIG. 6, for $0 \leq l \leq I-1$, denoted by $h_l(m)$ the $l^{th}$ portion ($N_P$ samples long) of the estimated channel impulse response, where the $l^{th}$ portion refers to contents from the $l^{th}$ bin which may be aliased when considering the estimated channel impulse response. The nth observed tone on $i^{th}$ interlace is then given by:

$$\hat{H}_i(n) = \frac{1}{\sqrt{N/2}} \cdot \sum_{l=0}^{I-1} \sum_{m=0}^{N_p-1} \left[ h_l(m) \cdot e^{-j2\pi \frac{l \cdot i}{8}} \right] \cdot e^{-j2\pi \frac{n \cdot m}{N_p}} \cdot e^{-j2\pi \frac{i \cdot m}{N}}, \quad (1)$$

for $i = 0, 2, 4, 6$.

The scaling factor of $\sqrt{N/2}$ comes from the implicit N/2-point FFT which is broken into two steps: $N_P$-point FFT $W_{N_P}$, followed by 4-point FFT. The last factors in (1) represents the phase ramp and the one before that corresponds to the $N_P$-point FFT operation applied on the $l^{th}$ channel portion, with the appropriate aliasing factor. Therefore, after the $N_P$-point IFFT $W_{N_P}^{-1}$ and the removal of the phase ramp $\Theta_i^{-1}$ from (1), remaining is a time-domain observation consisting of the aliased 512-long channel impulse response chunks. Referring to (1), the aliased observations corresponding to each one of the four non-zero interlaces occupied by TDM pilot 3 are given by $$\hat{h}_i = \Theta_i^{-1} \cdot W_{N_p}^{-1} \cdot \hat{H}_i = \frac{1}{2} \cdot \sum_{l=0}^{I-1} h_l \cdot e^{-j2\pi \frac{l \cdot i}{8}} = \frac{1}{2} \cdot \sum_{k=0}^{2} h_{l_k} \cdot e^{-j2\pi \frac{l_k \cdot i}{8}}, \quad (2)$$

for $i = 0, 2, 4, 6$.

Here, $$\Theta_i = diag\left\{ e^{-j \cdot 2\pi \frac{i \cdot m}{N}} \right\}_{m=0}^{N_p-1}$$

and $\hat{h}_i$, $\hat{H}_i$, $h_{l_k}$, are the vectors corresponding to the time-domain and frequency-domain pilot interlace observations and the $l_k^{th}$ channel bin as in FIG. 7 at 710, which is non-empty. For example, at 720 of FIG. 7, yields $(l_0, l_1, l_2)=(7,0,1)$. The scale factor of ½ is obtained as $\sqrt{N_P}/\sqrt{N/2}$. Note that (2) in general provides four equations; however, at any given instance, three out of four possible interlaces are occupied by "timing pilots" (refer to patterns in FIG. 5). Therefore, the last equality in (2) gives three equations with three unknowns. In this case shown in FIG. 7 at 720, the unknowns are $(h_1, h_0, h_7)$. The system is solved by inverting a 3×3 sub-matrix of a 4-point DFT matrix obtained by removing the row numbered i/2 (where i is the index of the black interlace in FIG. 5), and keeping columns $(l_0, l_1, l_2)$ mod 4. For example, consider the pattern shown in FIG. 7 with assumed channel bins (7,0,1). The 1536-long channel impulse response h(n) as in FIG. 7 at 720 is obtained from the observations corresponding to interlaces 0, 2 and 6 as:

$$\begin{bmatrix} h_7 \\ h_0 \\ h_1 \end{bmatrix} = \Omega_{4,[701]}^{-1} \cdot \begin{bmatrix} \hat{h}_0 \\ \hat{h}_2 \\ \hat{h}_6 \end{bmatrix}, \text{ where } \Omega_{4,[701]} = \frac{1}{2} \cdot \begin{bmatrix} 1 & 1 & 1 \\ j & 1 & -j \\ -j & 1 & j \end{bmatrix}. \quad (3)$$

Figure 8:
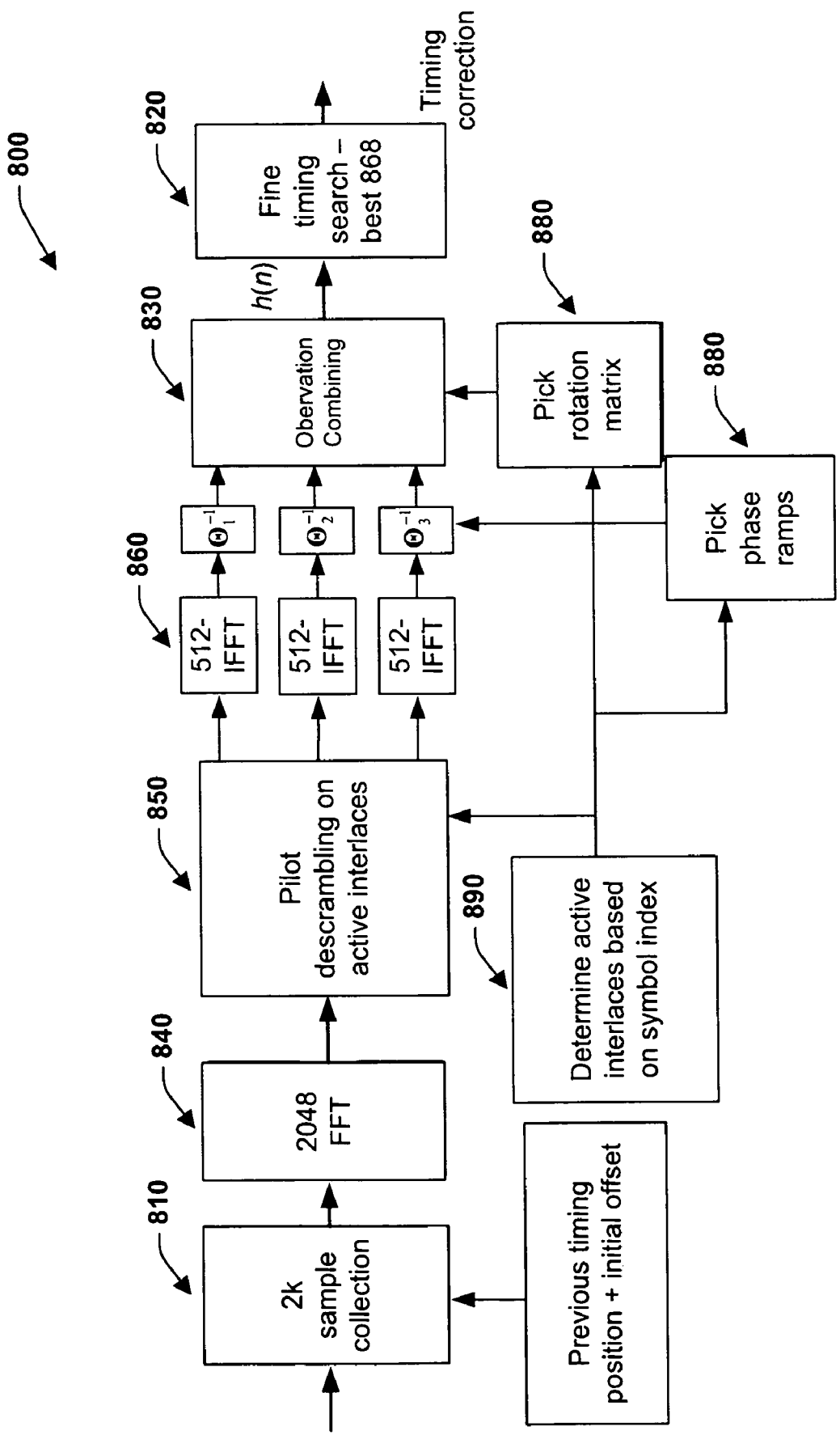
FIG. 8 illustrates an example block diagram of a timing synchronization algorithm on local/wide-area data boundaries.

FIG. 8 illustrates an example block diagram of a timing synchronization algorithm 800. The initial sampling time for a 2K-FFT block 810 is determined based on the previous timing after an appropriate initial offset has been applied. This offset is applied to make sure the sampled data indeed represents one period of TDM pilot 3 and does not include time-domain chips from neighboring OFDM symbols. This initial deliberate offset is then compensated for when timing corrections are applied. Next, the timing search is performed on a channel estimate of length 1536 in order to locate the non-zero channel content of length up to 768 consecutive chips. In one embodiment, this search can be performed by sliding the accumulation window of length 768 over the given channel estimate and looking for the maximum response of such accumulation. In other instances, the decision metric can be based on a linear combination of the accumulated energy within a window and a finite difference applied to the accumulated energy. Such metric will often reach its maximum at or near the first non-zero tap of the significant channel energy. This is also known as the first arriving path (FAP) detection algorithm. In yet another embodiment, after calculating the accumulated energy curve of the channel taps within the 768-long sliding window, the receiver may search for the leading edge and the trailing edge of the flat zone near the maximum energy. These edge locations can then be translated into the first arriving path and last arriving path (FAP and LAP) locations of the channel. This information, can in turn, be combined with the information on the deliberate initial offset, in order to determine the appropriate timing offset to be applied when processing the consecutive OFDM symbol.

Some constraints with the algorithm 800 are that the actual delay spread of the channel at hand does not exceed half of the estimation length, i.e., 768 in this case and that the occupied channel bins are known in advance—see FIG. 7. Under these assumptions, the timing performance depends on the channel characteristics and on the SNR at the entrance to the last box in FIG. 8 at 820. The useful signal at this point, i.e., the channel estimate h(n) has the same power per chip as the one when all four interlaces of the TDM pilot are used. As for the noise, it passes through several blocks before reaching this point and most of them are unitary (in other words, they do not change the noise power). The multiplication by $\Omega_{k,[\ldots]}^{-1}$ as in will change the noise power, since the matrices in question are not unitary. One can show that for every possible combination of interlaces i, and occupied bins $l_k$, the singular values of the corresponding $\Omega_k$ are given by [1, 1, 0.5]. Thus, the noise variance at the output of $\Omega_k^{-1}$ at 830 gets increased by a factor of (1+1+4)/3 =2. The channel estimation based on TDM pilot 3 is associated with the static loss of 3dB when compared to the one obtained during initial fine timing. However, the initial fine timing estimate is by 3dB better then the estimates collected at the channel estimation block, and thus the fine timing search block 820 is not expected to perform worse than the corresponding block used in data mode time tracking. Other blocks in the algorithm 800 include an FFT block at 840, a descrambling block at 850, IFFT blocks at 860, rotation matrix selector at 870, a phase ramp selector at 880, and an active interlace determiner at 890.

Figure 9:
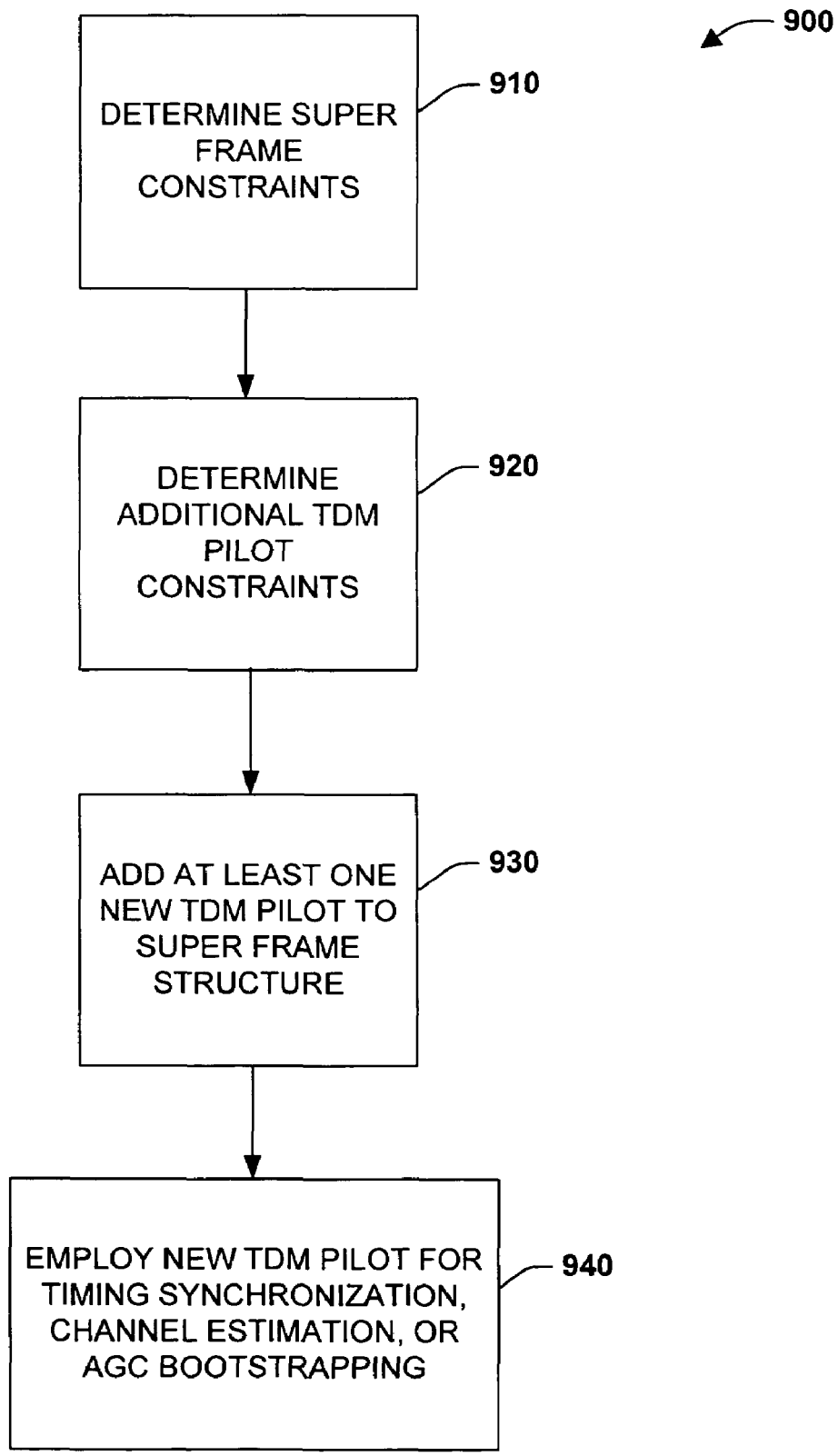
FIG. 9 illustrates an example pilot symbol process for a wireless system.

FIG. 9 illustrates a pilot symbol process 900 for wireless systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 910, one or more super frame constraints are determined in view of employing additional TDM pilot symbols. As noted above this could include symbol locations, slot mapping considerations, scrambling considerations, mask considerations, slot energy considerations, backward compatibility considerations, and impacts on current MAC layer frameworks. As can be appreciated, modifications supplied at a transmitter of an OFDM broadcast would be considered and accounted for at the receiver end. At 920, additional TDM pilot constraints are considered. In one aspect, this may include determining how many additional symbols to add to a conventional symbol set of TDM1 and TDM2.

Generally, one additional TDM3 may be included but more than one symbol can be added to the super frame and associated specification. Other considerations include one or more of the constraints determined at 910 for the overall super frame structure. At 930, at least one additional TDM pilot symbol is added to a super frame structure. As noted above, a first additional pilot generally follows TDM2, where subsequent additional pilots are employed for separation between local and wide-area information broadcasts. As can be appreciated, other configurations are possible. At 940, when the additional pilots have been added to the super frame, timing synchronization, channel estimation, and/or AGC bootstrapping can be performed at respective receiver that acquire such information in an OFDM broadcast.

Figure 10:
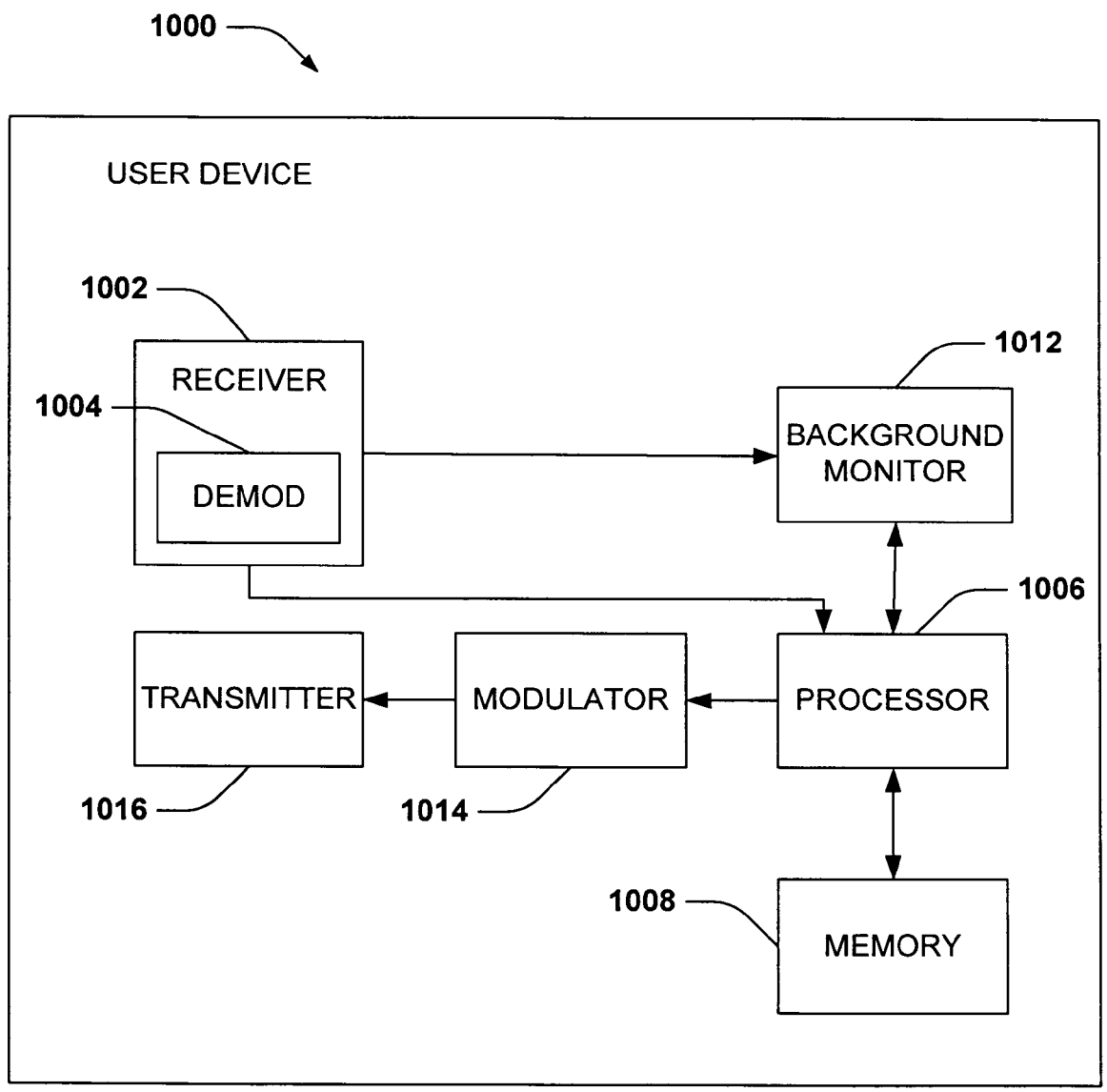
FIG. 10 is a diagram illustrating an example user device for a wireless system.

FIG. 10 is an illustration of a user device 1000 that is employed in a wireless communication environment, in accordance with one or more aspects set forth herein. User device 1000 comprises a receiver 1002 that receives a signal from, for instance, a receive antenna (not shown), and performs typical actions thereon (e.g., filters, amplifies, down converts, etc.) the received signal and digitizes the conditioned signal to obtain samples. A demodulator 1004 can demodulate and provide received pilot symbols to a processor 1006 for channel estimation. Processor 1006 can be a processor dedicated to analyzing information received by receiver 1002 and/or generating information for transmission by a transmitter 1016, a processor that controls one or more components of user device 1000, and/or a processor that both analyzes information received by receiver 1002, generates information for transmission by transmitter 1016, and controls one or more components of user device 1000. User device 1000 can additionally comprise memory 1008 that is operatively coupled to processor 1006.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Figure 11:
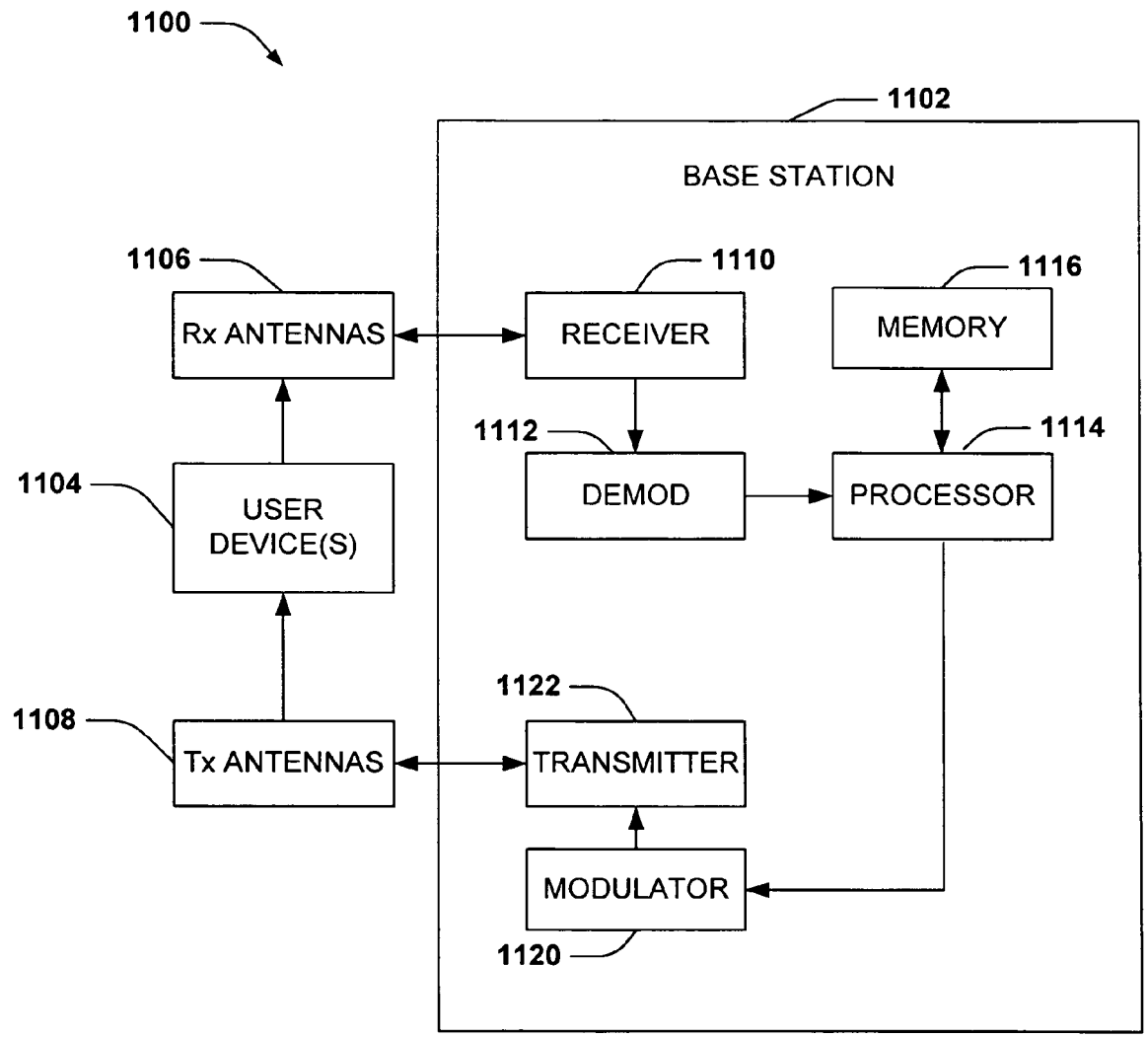
FIG. 11 is a diagram illustrating an example base station for a wireless system.

FIG. 11 illustrates an example system 1100 that comprises a base station 1102 with a receiver 1110 that receives signal(s) from one or more user devices 1104 through a plurality of receive antennas 1106, and a transmitter 1124 that transmits to the one or more user devices 1104 through a transmit antenna 1108. Receiver 1110 can receive information from receive antennas 1106 and is operatively associated with a demodulator 1112 that demodulates received information. Demodulated symbols are analyzed by a processor 1114 that is similar to the processor described above, and which is coupled to a memory 1116.

Figure 12:
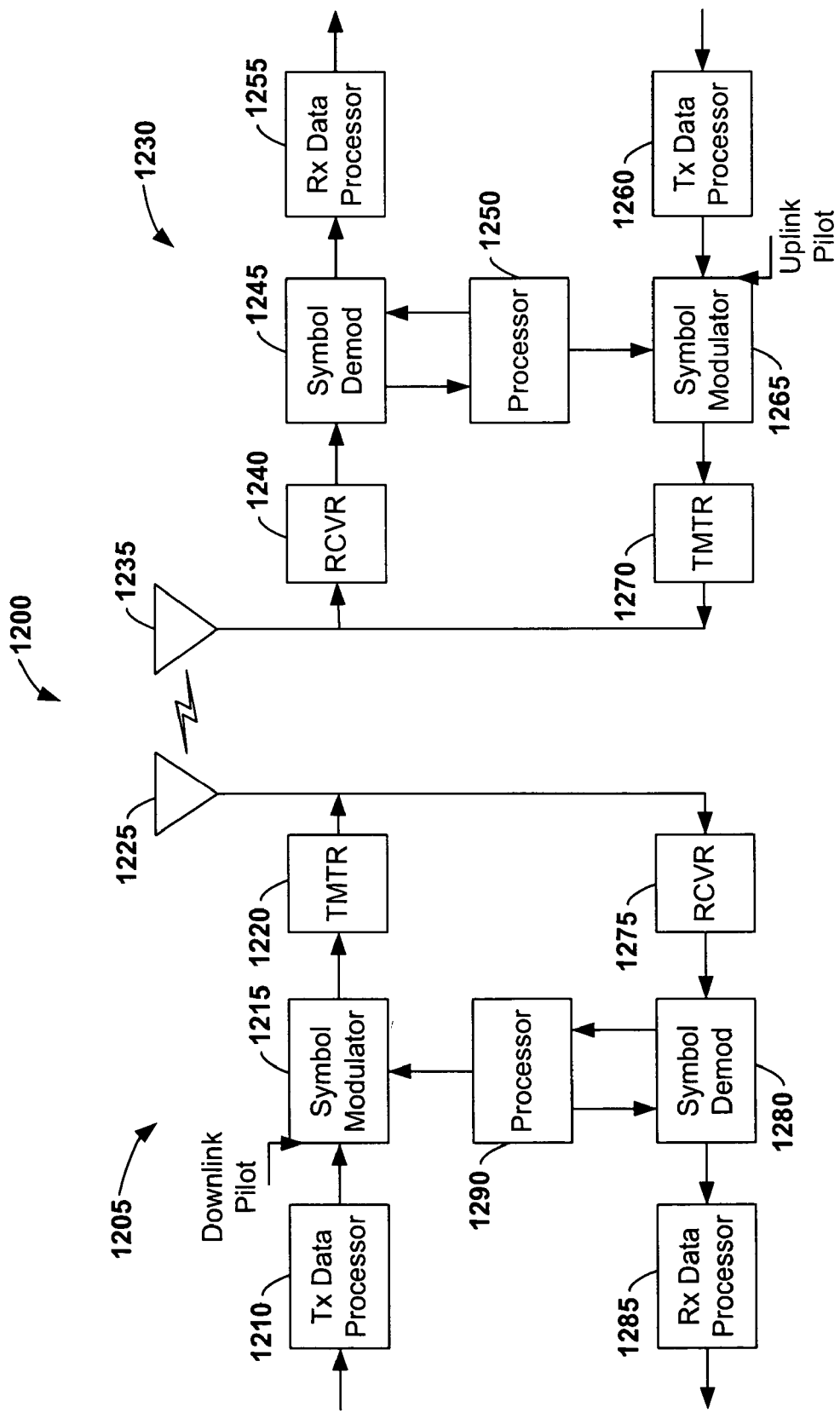
FIG. 12 is a diagram illustrating an example transceiver for a wireless system.

FIG. 12 shows an exemplary wireless communication system 1200. The wireless communication system 1200 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1220 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency down converts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol de-maps), de-interleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for time synchronization at a wireless receiver, comprising:

receiving in the wireless receiver, a data frame having at least one Time Division Multiplexed (TDM) pilot symbol at a transition located between wide and local waveforms, the at least one TDM pilot symbol having wide area pilots positioned in at least a first subcarrier interlace and local pilots positioned in at least a second subcarrier interlace distinct from the first subcarrier interlace; and processing the at least one TDM pilot symbol to determine at least one of a channel estimate or timing synchronization.

2. The method of claim 1, further comprising processing the at least one TDM pilot symbol, with odd interlaces associated with the TDM pilot being set to zero.

3. The method of claim 1, further comprising receiving a data frame that includes Orthogonal Frequency Division Multiplexed (OFDM) symbols.

4. The method of claim 3, further comprising employing at least three even interlaces out of four even interlaces for time synchronization on the OFDM symbols following a waveform boundary.

5. The method of claim 3, further comprising performing timing synchronization via at least one Fast Fourier Transform (FFT), and at least one Inverse Fast Fourier Transform (IFFT).

6. The module of claim 5, further comprising providing a pilot descrambling component to process data from the FFT component.

7. The method of claim 6, further comprising determining and applying a phase ramp operating at an interlace i, where i is an integer.

8. The method of claim 7, further comprising determining at least one vector corresponding to a time domain and a frequency domain pilot interlace observation.

9. The method of claim 1, further comprising employing the at least one TDM pilot symbol for channel estimation of at least one of a wide area channel or a local channel.

10. The method of claim 9, further comprising processing one interlace of the at least one TDM pilot symbol as a Frequency Division Multiplexed (FDM) pilot interlace corresponding to data content prior to a boundary. and processing another interlace of the at least one TDM pilot symbol as an FDM pilot interlace corresponding to data content following the boundary.

11. The method of claim 1, further comprising processing an interlace pattern of the at least one TDM pilot symbol in accordance with a pilot staggering pattern.

12. The method of claim 1, further comprising determining a descrambling parameter for the at least one TDM pilot symbol based on a wide area identifier (WID) and a local area identifier (LID).

13. The method of claim 1, further comprising determining data regarding a location of the at least one TDM pilot symbol.

14. A wireless communications apparatus, comprising:
a memory that includes a component to receive at least one TDM pilot symbol per transition between wide and local waveforms in a super frame, the at least one TDM pilot symbol including wide area pilots positioned in at least a first subcarrier interlace and local pilots positioned in at least a second subcarrier interlace distinct from the first subcarrier interlace; and
at least one processor associated with a receiver that decodes the super frame over a wireless network, the processor employs the TDM pilot symbol to determine a timing correction and/or a channel estimation for the wireless communications apparatus.

15. A method for channel estimation at a wireless receiver, comprising:
receiving, in the wireless receiver, at least one TDM pilot symbol located at a transition between wide and local waveforms from an OFDM broadcast, the at least one TDM pilot symbol including wide area pilots positioned in at least a first subcarrier interlace and local pilots positioned in at least a second subcarrier interlace distinct from the first subcarrier interlace; and
decoding the at least one TDM pilot symbol to facilitate channel estimation for the wireless receiver.

16. A method for time synchronization at a wireless receiver, comprising:
receiving, in the wireless receiver, a data frame having at least a first Time Division Multiplexed (TDM) pilot symbol associated with a local waveform boundary and at least a second TDM pilot symbol associated with a wide-area waveform boundary, wherein the first TDM pilot symbol includes local pilots positioned in at least a first subcarrier interlace, and the second TDM pilot symbol includes wide area pilots positioned in at least a second subcarrier interlace distinct from the first subcarrier interlace; and
processing the first TDM pilot symbol and the second TDM pilot symbol during the data frame to determine time synchronization.

17. The method of claim 16, further comprising processing a three symbol packet that includes a local symbol L, a local symbol L−1, and the first Time Division Multiplexed (TDM) pilot symbol associated with the local waveform to facilitate channel estimation for local symbols L or L−1.

18. The method of claim 16, further comprising processing a three symbol packet that includes a wide-area symbol N, a wide-area symbol N−1, and the second Time Division Multiplexed (TDM) pilot symbol associated with the wide-area waveform to facilitate channel estimation for wide-area symbols N or N−1.

* * * * *